(12) United States Patent
Lee et al.

(10) Patent No.: US 8,286,952 B2
(45) Date of Patent: Oct. 16, 2012

(54) VAPOR DISTRIBUTOR FOR GAS-LIQUID CONTACTING COLUMNS

(75) Inventors: Adam T. Lee, Dallas, TX (US); Farzad G. Tahmassi, Carrollton, TX (US); Lindsey Vuong, Allen, TX (US); Zainab Kayat, Selangor (MY); Mohd Rizal Bin Abdul Rahman, Shah Alam (MY); Arman Bin Anuar, Melaka (MY)

(73) Assignees: AMT International, Inc., Plano, TX (US); Petroliam Nasional Berhad, Kuala Lumpur (MY)

( * ) Notice: Subject to any disclaimer, the term of this patent is extended or adjusted under 35 U.S.C. 154(b) by 411 days.

(21) Appl. No.: 12/615,721

(22) Filed: Nov. 10, 2009

(65) Prior Publication Data

US 2010/0276821 A1 Nov. 4, 2010

Related U.S. Application Data

(60) Provisional application No. 61/173,814, filed on Apr. 29, 2009.

(51) Int. Cl.
*B01F 3/04* (2006.01)
(52) U.S. Cl. ...................................... 261/79.2; 261/109

(58) Field of Classification Search ................. 261/79.2, 261/109
See application file for complete search history.

(56) References Cited

U.S. PATENT DOCUMENTS

| | | |
|---|---|---|
| 4,770,747 A | 9/1988 | Muller |
| 4,909,967 A | 3/1990 | Binkley et al. |
| 5,106,544 A | 4/1992 | Lee et al. |
| 5,464,573 A | 11/1995 | Tokerud et al. |
| 5,605,654 A | 2/1997 | Hsieh et al. |
| 5,632,933 A | 5/1997 | Yeoman et al. |
| 6,338,828 B1 | 1/2002 | Stupin et al. |
| 6,889,961 B2 | 5/2005 | Laird et al. |
| 6,889,962 B2 | 5/2005 | Laird et al. |
| 6,948,705 B2 | 9/2005 | Lee et al. |
| 6,997,445 B2 * | 2/2006 | Vedrine ........................... 261/96 |
| 7,104,529 B2 | 9/2006 | Laird et al. |

* cited by examiner

*Primary Examiner* — Robert A Hopkins
(74) *Attorney, Agent, or Firm* — Davis & Bujold, P.L.L.C.

(57) ABSTRACT

A vapor distributor for use in atmospheric or vacuum columns includes a new design of vapor inlet device, or vapor horn, to provide superior mixing and distribution of a tangential first feed and a vertical second feed. New vapor inlet device has an inlet dividing the first feed into two portions, each flowing in respective housings in opposed circulation directions, and a plurality of vanes for redirection of vapor. Mixing and distribution of feeds by the vapor distributor is further enhanced by inclusion in vapor distributor of a mixer and vapor directing plates.

13 Claims, 12 Drawing Sheets

VAPOR DISTRIBUTOR FOR GAS-LIQUID CONTACTING COLUMNS

FIELD OF THE INVENTION

The present invention relates to a vapor distributor system for more efficient mixing and even distribution of vapor streams in a column. The present invention provides for good mixing of a feed stream, comprising of a predominant volume percent of vapor, (hereby referred to as "vapor") fed laterally into a column with a vertical vapor stream within that column, for example in mid to large diameter vacuum distillation columns at oil refineries.

BACKGROUND

Historically, providing uniform vapor distribution in fractionation towers, and in particular high capacity and large diameter fractionation towers, is one of the most challenging aspects of designing a high performance column. Examples include vapor distribution in the flash zone of a vacuum distillation unit (VDU) at oil refineries. For all towers, and especially for large diameter columns, it requires an innovative design for the vapor inlet device and internals. It will be recognized that such designs may also be used for a variety of other applications.

Several innovations have been made to address the problem of ensuring good mixing. Muller in U.S. Pat. No. 4,770,747 (1988) describes an inlet horn for feeding a vapor stream tangentially into an atmospheric or vacuum column so as to provide distribution of the inlet vapor stream and to provide separation of any entrained liquid in said stream. Vanes are used to deflect the vapor component of the stream in a controlled manner. Lee et al. in U.S. Pat. No. 5,106,544 (1992) describe a combination of an inlet horn having a 360 degree annular housing with directional flow vanes. Hsieh et al. in U.S. Pat. No. 5,605,654 (1997) describe a vapor distributor having an annular housing with a series of ports for feeding the vapor stream in a distributed manner. Laird et al. in U.S. Pat. No. 6,889,961 (2005) described a modified vapor distributor with baffles in the lower intermediate transitional section to reduce swirling of the feed and thereby improve distribution. Laird et al. in U.S. Pat. No. 6,889,962 (2005) describe an annular inlet vapor horn that circulates the inlet feed so as to de-entrain any liquid droplets while providing for more even distribution of the inlet flow across the column. Lee et al. in U.S. Pat. No. 6,948,705 (2005) describe a gas-liquid contacting apparatus in which a gas stream, for example steam, is fed into a column via an annular vapor horn. Laird et al. in U.S. Pat. No. 7,104,529 (2006) describe a vapor distributor apparatus, the vapor horn of which includes a series of vanes the sizes of which increase with distance from the inlet nozzle of the vapor distributor. In the majority of devices having a vapor horn, the inlet flow is uni-directional and has a cyclonic effect on the vapor feed. Baffles or vanes are used to redirect or disrupt the circular flow of the inlet stream. Yeoman et al. in U.S. Pat. No. 5,632,933 (1997) describe an annular bi-directional gas flow device having a plurality of outlets at an inner wall of the housing and a series of flow directing vanes for distribution of an inlet vapor stream across the breadth of a column.

SUMMARY

A new vapor distributor is provided in which a laterally fed first feed of predominantly vapor is split into two streams. The lateral feed is split at the inlet into the vapor inlet device (or horn) into two streams which then travel in opposed directions along two respective housings. In contrast, prior art vapor distributors typically have a single stream of vapor feed fed along a single housing. In the present invention, vanes are installed to redirect each of the streams so as to effect distribution of the lateral (first) feed. The housings are proportioned according to the respective streams, and have correspondingly different numbers of vanes. This innovative design effectively reduces the equivalent area, or blockage, by the vapor inlet device of the column cross-sectional area. As a result, the C-factor in that zone does not undergo the same increase that is experienced using prior art vapor distributors.

Liquid droplets in the first vapor feed are cyclonically directed to the column walls where they flow downwards. The counter-flow design minimizes re-entrainment as the controlled tangential force assists in separating liquid droplets from the first vapor feed. Lateral flow and back-mixing are reduced.

In a second embodiment of the vapor distributor system the new vapor inlet device is coupled with an attached mixer and gas direction plates so as to further improve mixing and distribution, break vortices and minimize lateral flows.

DESCRIPTION OF THE DRAWINGS

For a more complete understanding of the present invention and for further objects and advantages thereof, reference is made to the following description taken in conjunction with the accompanying drawings.

FIG. 1b is a side view of the portion of the column shown in FIG. 1a.

FIG. 2a is a perspective view of a prior art vapor inlet device shown in FIG. 1a.

FIG. 2b is a top view of the prior art vapor inlet device illustrated in FIG. 2a.

FIG. 3b is a top view of the vapor inlet device shown in FIG. 3a.

FIG. 4b is a side view of the vapor distributor design illustrated in FIG. 4a.

FIG. 7b is a side view of the vapor distributor design illustrated in FIG. 7a.

DETAILED DESCRIPTION

Figure 1A:
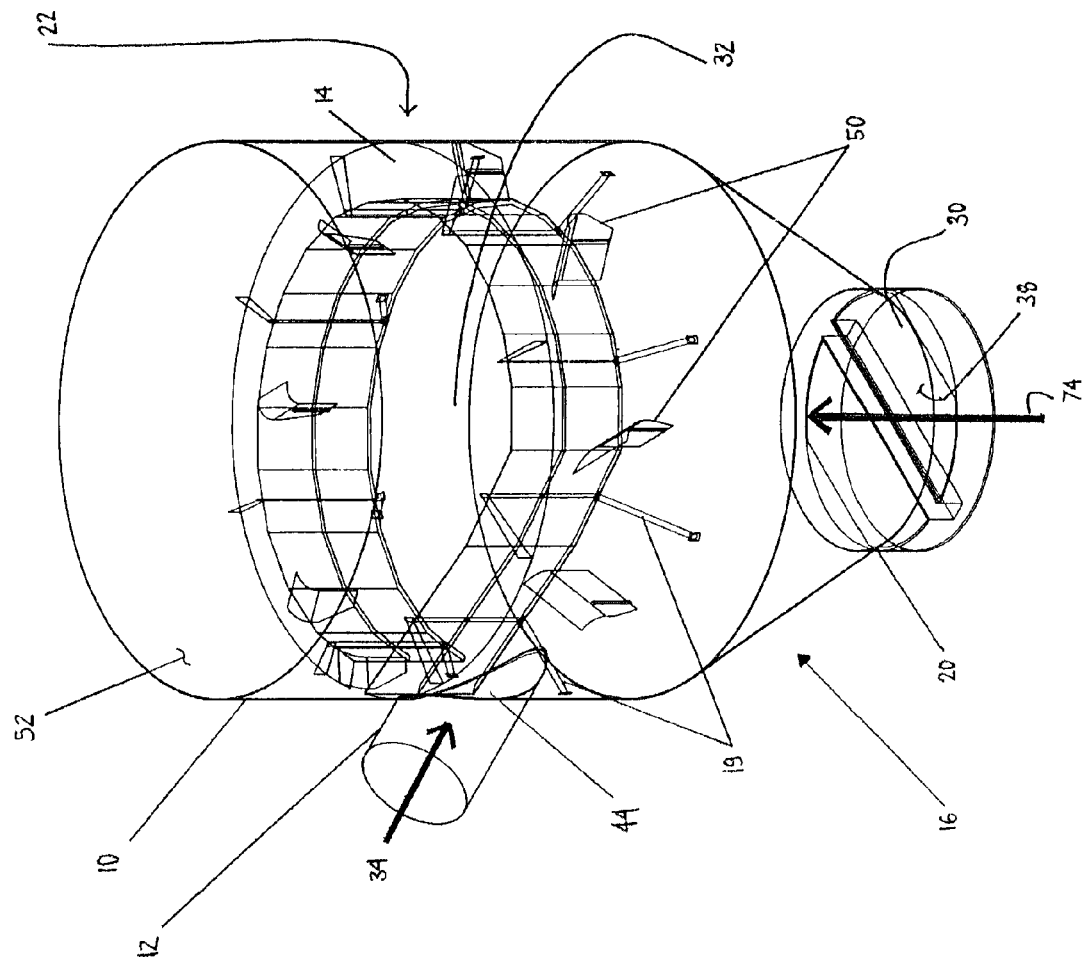
FIG. 1a is a perspective view of a portion of a prior art vapor distillation column having a vapor inlet device.
Figure 1B:
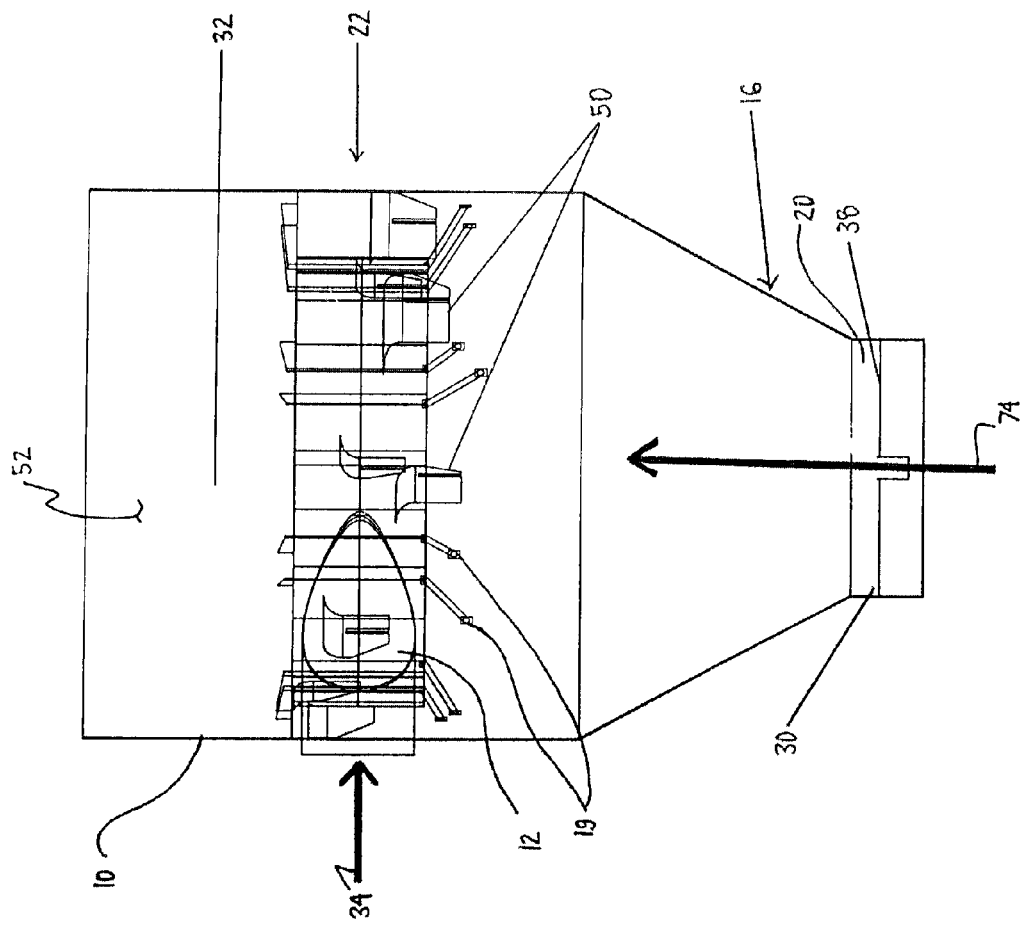

Exemplary embodiments of the invention, which are non-limiting, will now be described with reference to FIG. 1 through FIG. 7. A same reference numeral will be used to identify the same component in each design and, when it is necessary to distinguish between different designs of that component, the same reference numeral will be used in combination with a different modifying letter, for example 22, 22a, 22b, 22c.

Referring to FIGS. 1 and 2, a vapor distillation column 10 has a vapor distributor 22. Vapor distributor 22 includes a vapor inlet pipe 12 and a vapor inlet device 14, also called a vapor horn, above a bottom section 16 of said column 10. Vapor inlet device 14 is secured to shell 52 of column 10 by, for example, a plurality of structural members 19.

The effect of the design of vapor distributor 22 of the present invention were determined using simulation of performance in a large diameter column 10 that is directly above a smaller diameter section 20. Comprehensive Computational Fluid Dynamic (CFD) modeling was used to analyze the performance of different embodiments of vapor distributor 22. Initially, analysis was made of performance of a typical prior art vapor distributor 22 having vapor inlet device 14. Next, performance was determined for an enhanced and novel design vapor distributor 22a having a newly designed inlet device 14a. Then analysis was done for a second embodiment of vapor distributor 22b having inlet device 14a and an innovative mixing/dispersion device 80, and equalizer plates 82, that serve as vapor flow straighteners and assist in improving distribution. Each of these components may optionally be further modified as will be described below for an optimized solution for vapor feed mixing and distribution in an atmospheric or vacuum column.

The specific objectives achieved through the new design of the nozzle inlet device and internals herein are to:

Develop a new, improved mechanical design to minimize blockage of the column cross-section area for vapor flow;

Minimize the entrainment of liquid droplets in the vapor distributed to an area, such as a packed bed above, since excessive entrainment could contaminate side-draw products below any packed beds located above the vapor distributor; and Optimize the distribution and mixing of first feed 34 entering column 10 with second feed 74 as it rises above flash zone 32.

These objectives were achieved through a sequence of analytical CFD simulations of different vapor distributor designs, with and without additional modifications to the apparatus. The purpose of the simulation case studies was to comprehensively evaluate (Case 1) a prior art vapor inlet device 14 (Case 2) the first embodiment of vapor distributor 22a having a new design for inlet device 14a, and (Case 3) a completely redesigned apparatus incorporating vapor distributor 22b having a new design for inlet device 14a with mixing device 80 and equalizer plates 82. Finally, (Case 4) a further embodiment of prior art vapor distributor 22c with vapor inlet device 14 then was developed and studied to further validate the new technology.

Figure 2A:
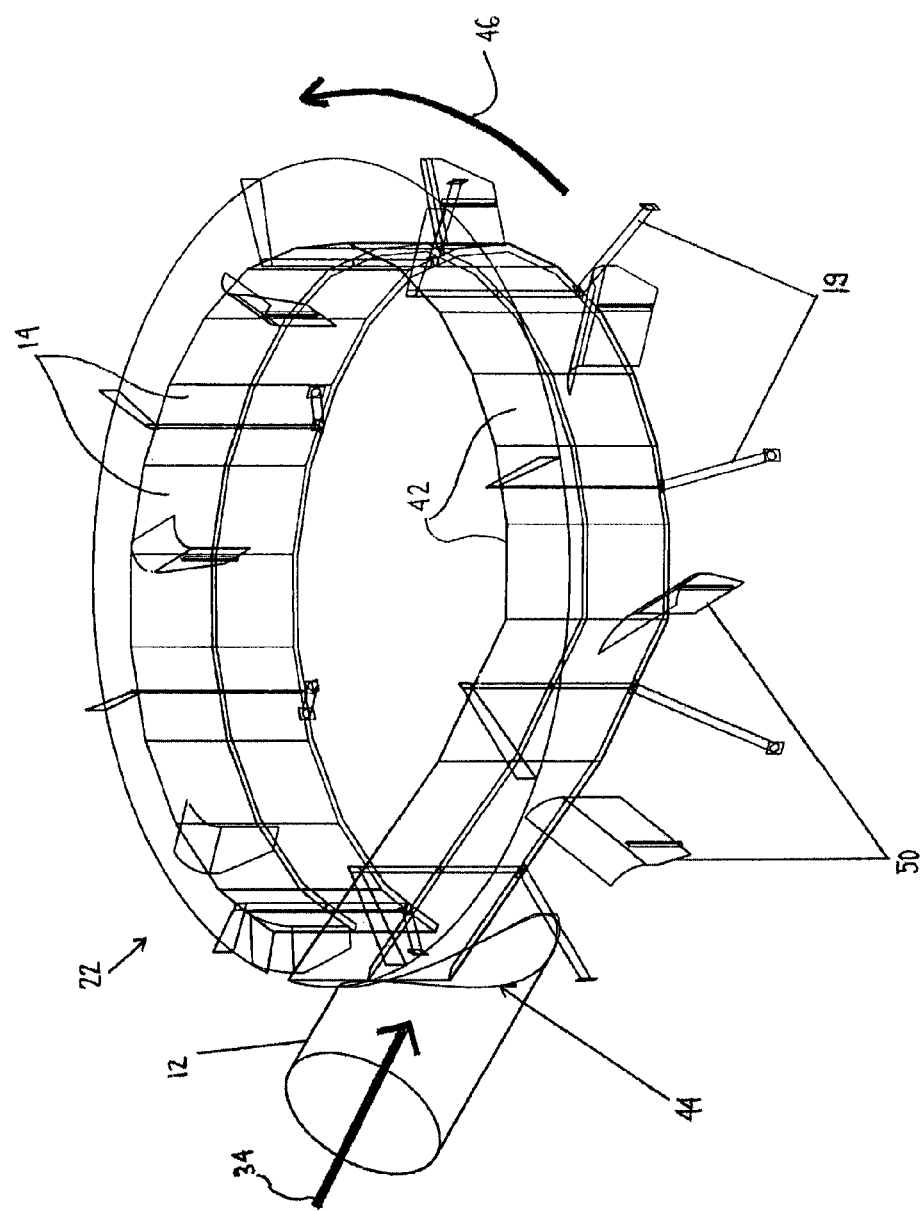
Figure 2B:
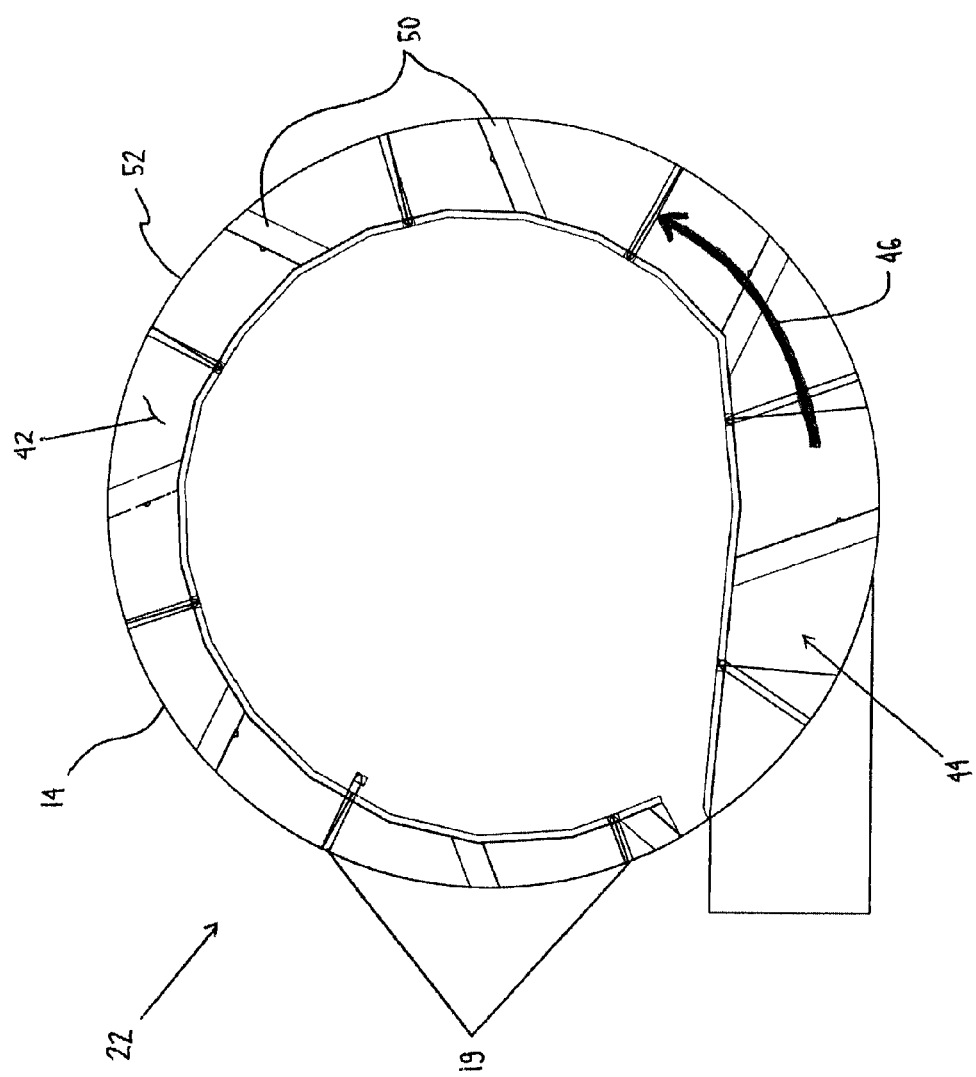

Prior art vapor distributor 22 having vapor inlet device 14 has the following characteristics. Referring to FIG. 2a, prior art vapor inlet device 14 is encased in a single, almost 360° housing 42 within shell 52, device 14 being truncated along the path of vapor flow, the direction of which is shown by arrow 46. That is, the cross sectional area of prior art inlet device 14 steadily decreases along the device so that vapor is increasingly distributed. Shell 52 typically, but not necessarily, is an inner surface of a wall of column 10.

With a nozzle sized for the feed throughput to a column of this magnitude, the blockage of the vapor inlet device 14 housing restricts the area for vapor flow as it rises above housing 42. As a result, the vapor capacity factor, or C-factor, (an indicator of vapor loading in the tower based on superficial vapor velocity and physical properties of the vapor and liquid) becomes greater at the elevation of vapor inlet device housing 42.

A plurality of downward vanes 50 situated throughout the device are staggered at interval elevations for vapor distribution and mixing with second feed 74 rising from below.

First feed 34 enters vapor inlet device 14 at a high velocity and flows cyclonically in one direction 46 around the conical section of flash zone 32. The great tangential force experienced by first feed 34 results in the vapor striking top stripping tray 38, which may lead to black-oil entrainment and tray premature flooding. The layout of vanes 50 results in good distribution at the first few vanes 50, while the vapor does not distribute well at the last few vanes 50 in the prior art vapor distributor 22. The simulations showed that, as the vapor rises above prior art vapor inlet device 14, back-mixing and lateral flow are prevalent upon entering the collector tray.

The stripping vapor, second feed 74, enters flash zone 32 from the stripping trays 38 and swirls in a centralized vortex due to the force of first feed 34. There is forced mixing between of first feed 34 with second feed 74 due to the severe force of first feed 34, and consequently there is a high probability of re-entrainment (resulting from un-diffused high local feed gas velocities) with the prior art design illustrated in FIGS. 1a and 1b.

Flow trajectories of the both first feed 34 and second feed 74 found in the CFD simulations of the prior art vapor distributor 22 show that insufficient mixing and lateral flow result in poor distribution in the area above prior art vapor inlet device 14.

Figure 3A:
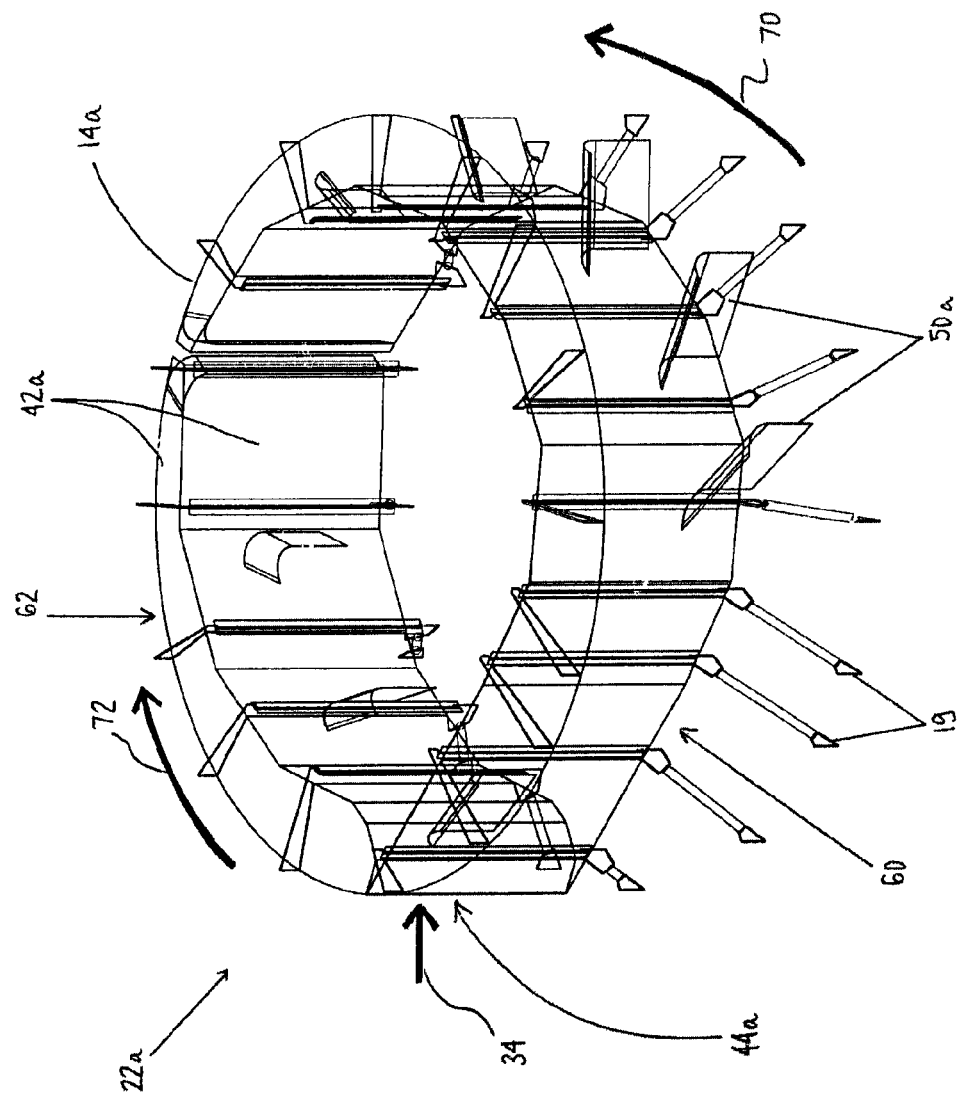
FIG. 3a is a perspective view of a vapor inlet device according to the present invention.
Figure 3B:
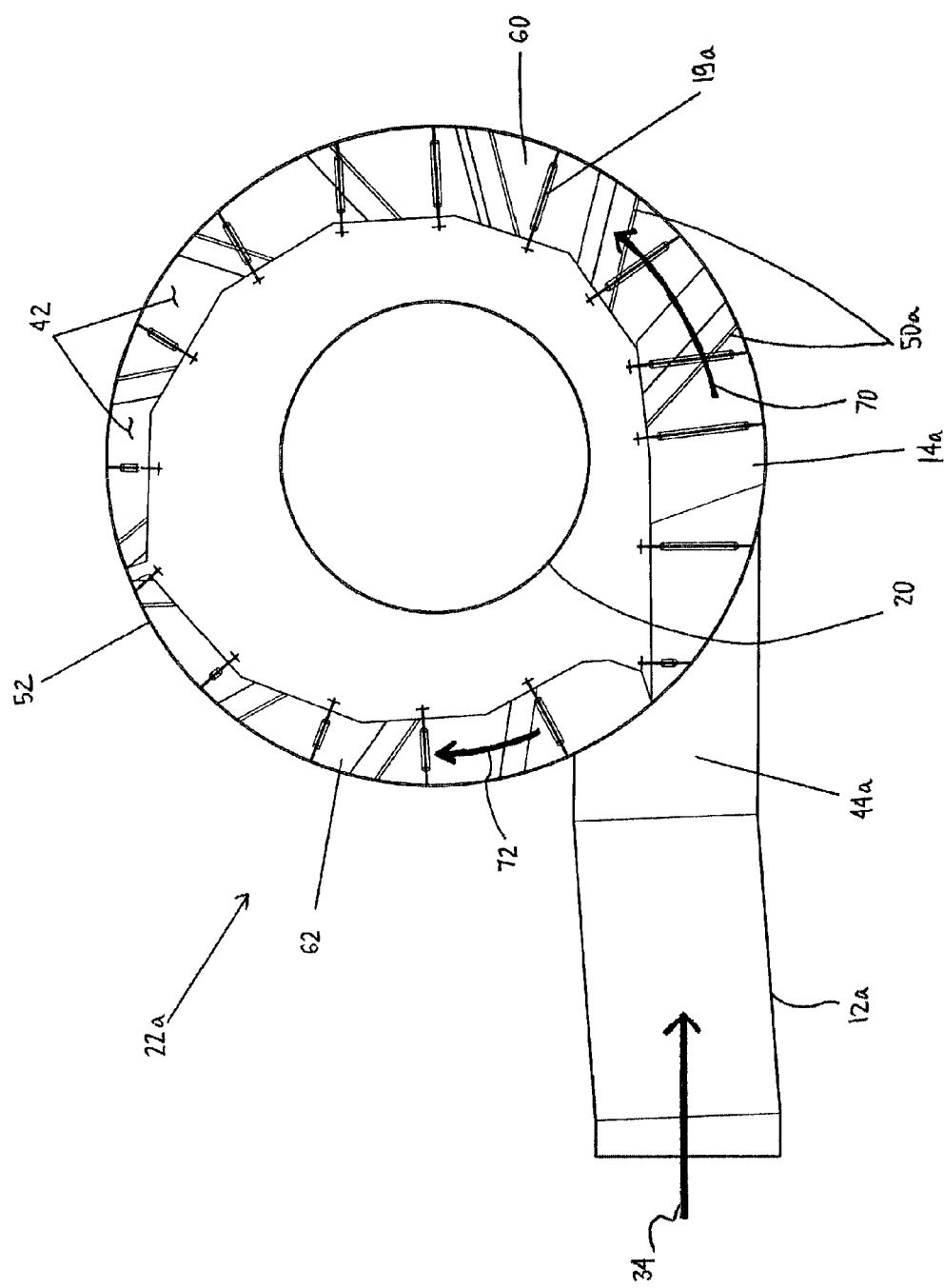

Referring to FIGS. 3a through 3b, the architecture of new vapor distributor 22a having a new design of vapor inlet device 14a differs from that for prior art vapor distributor 22.

Figure 4A:
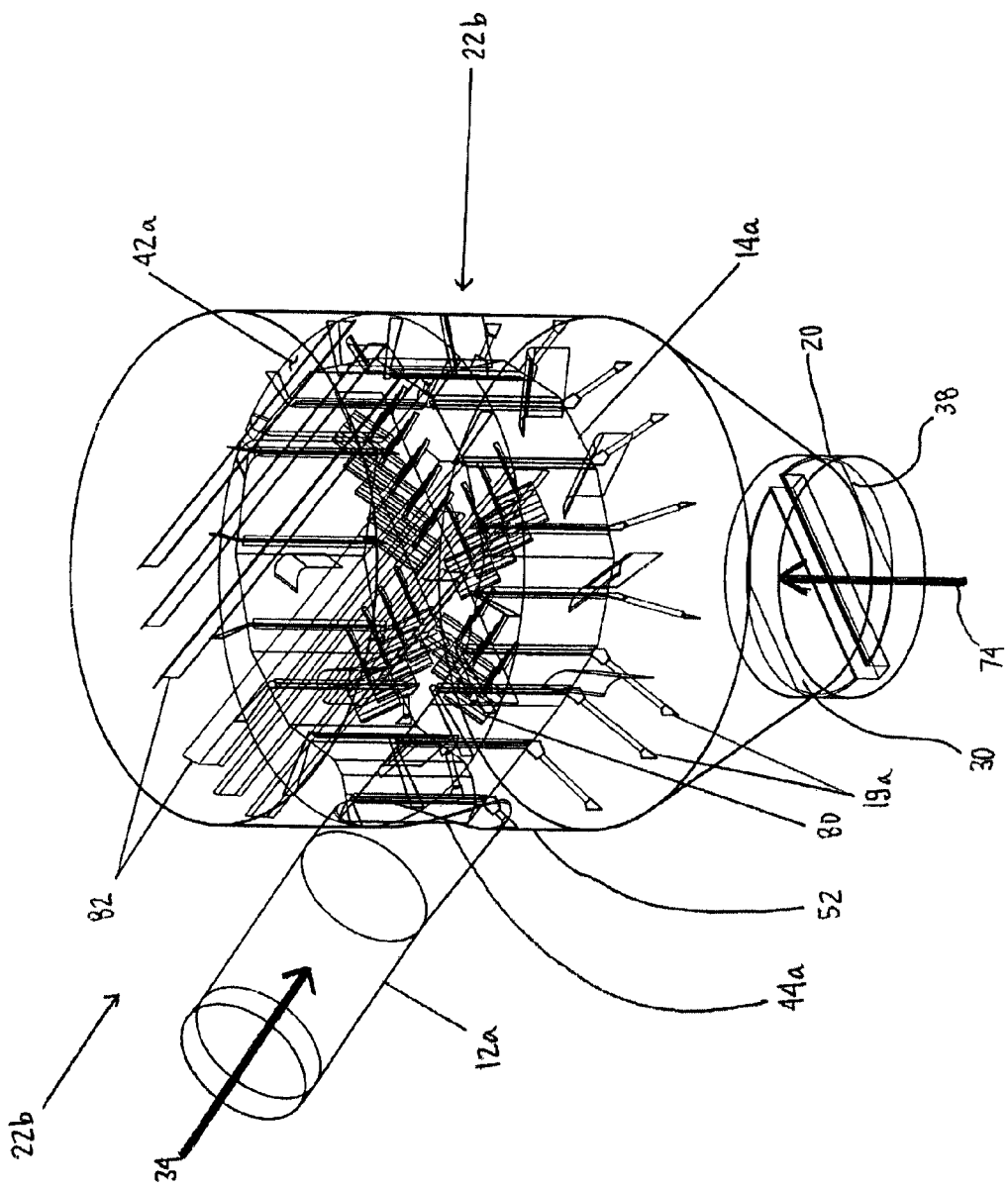
FIG. 4a is a perspective view of an embodiment of a vapor distributor design according to the present invention incorporating a new vapor inlet device illustrated in FIG. 3a, a mixer shown in FIG. 5, and gas directing plates shown in FIG. 6
Figure 4B:
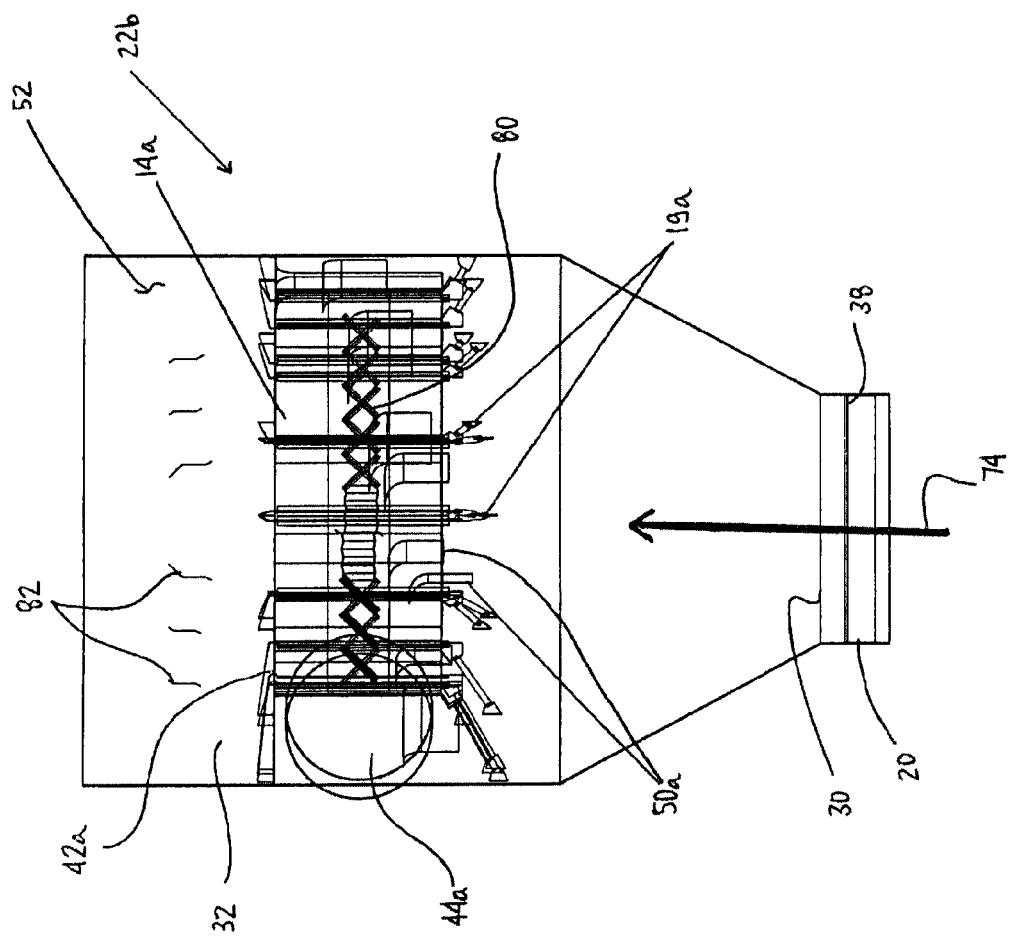

FIGS. 4a and 4b show details of the design of the embodiment. FIG. 3a is a simplified illustration of the design of housing 42a of new vapor distributor 22a. In contrast to single housing 42 in prior art embodiments, in the new embodiment it is divided into two housings 60, 62. The split housing design results in a significantly decrease in momentum of first feed 34 by creating a controlled opposing force. In essence, the vapor first feed 34 is divided at inlet 44a into two separated streams 70, 72 at a divided nozzle 44a which then flow into corresponding separate housings 60, 62. As can be seen in the embodiment shown in FIGS. 3a through 3b, housings 60, 62 are preferably of different sizes to accommodate the different streams 70, 72. It will be recognized that housings 60, 62 having different proportions and may have correspondingly different numbers of vanes 50a. This innovative design comprising separate housings 60, 62 effectively reduces the equivalent area, or blockage, by the vapor inlet device 14a. When compared to the blockage by a single housing 42 in the prior art embodiments at the same inlet nozzle and column size, the blockage with the new vapor distributor 22a is typically reduced by more than 30%. Thus, even with a significantly larger nozzle inlet 44a to accommodate the throughput, column 10 cross-sectional area is not sacrificed with the new design illustrated in FIGS. 3a and 3b, i.e. the C-factor in that zone does not undergo the significant increase that is experienced with the prior art design illustrated in FIGS. 2a and 2b. Consequently, the present invention enables column designs that have increased size of nozzle inlet 44 without a requirement to enlarge the diameter of column 10, and without causing any increase of blockage of the cross-sectional area of said column 10.

In the prior art, second feed 74 enters flash zone 32 from stripping trays 38 below and swirls in a centralized vortex due to the force of first feed 34, and the result is limited interaction or poor mixing between first feed 34 and second feed 74.

Every vane 50a in new vapor inlet device 14a is designed to optimize flow diversion and mixing so as to uniformly distribute first feed 34 and evenly mix it with second feed 74 throughout the entire cross-sectional area of that portion of column 10. Selected vanes 50a can be customized for an aerodynamic design so as to prevent first feed 34 from striking stripping trays 38 below.

The combination of all vanes 50a in new vapor inlet device 14a uniformly distributes first feed 34 throughout the entire housing 42a. CFD simulation showed there is a marked improvement in distribution quality compared to the prior art designs. The combination of improved distribution quality throughout column 10 having new vapor inlet device 14a and the customized aerodynamic design of select vanes 50a results in the majority of feed liquid droplets being pushed towards the column wall, shell 52, by the tangential force of the first vapor feed 34, less severely than in the prior art design. Subsequently, liquid droplets in first feed 34 flow down to stripping section 30 without striking stripping trays 38.

The controlled tangential force assists in separating liquid particles from first feed 34 and thus reduces entrainment. Finally, lateral flow and back-mixing are reduced as combined first feed 34 and second feed 74 rise above new vapor inlet device 14a and into the area above.

A second embodiment of vapor distributor system 22b has new vapor inlet device 14a coupled with mixer 80 and plates 82. Second embodiment 22b shows enhanced performance compared to use of embodiment 22a alone. The enhanced design has the following features and represents an optimized system.

Figure 5:
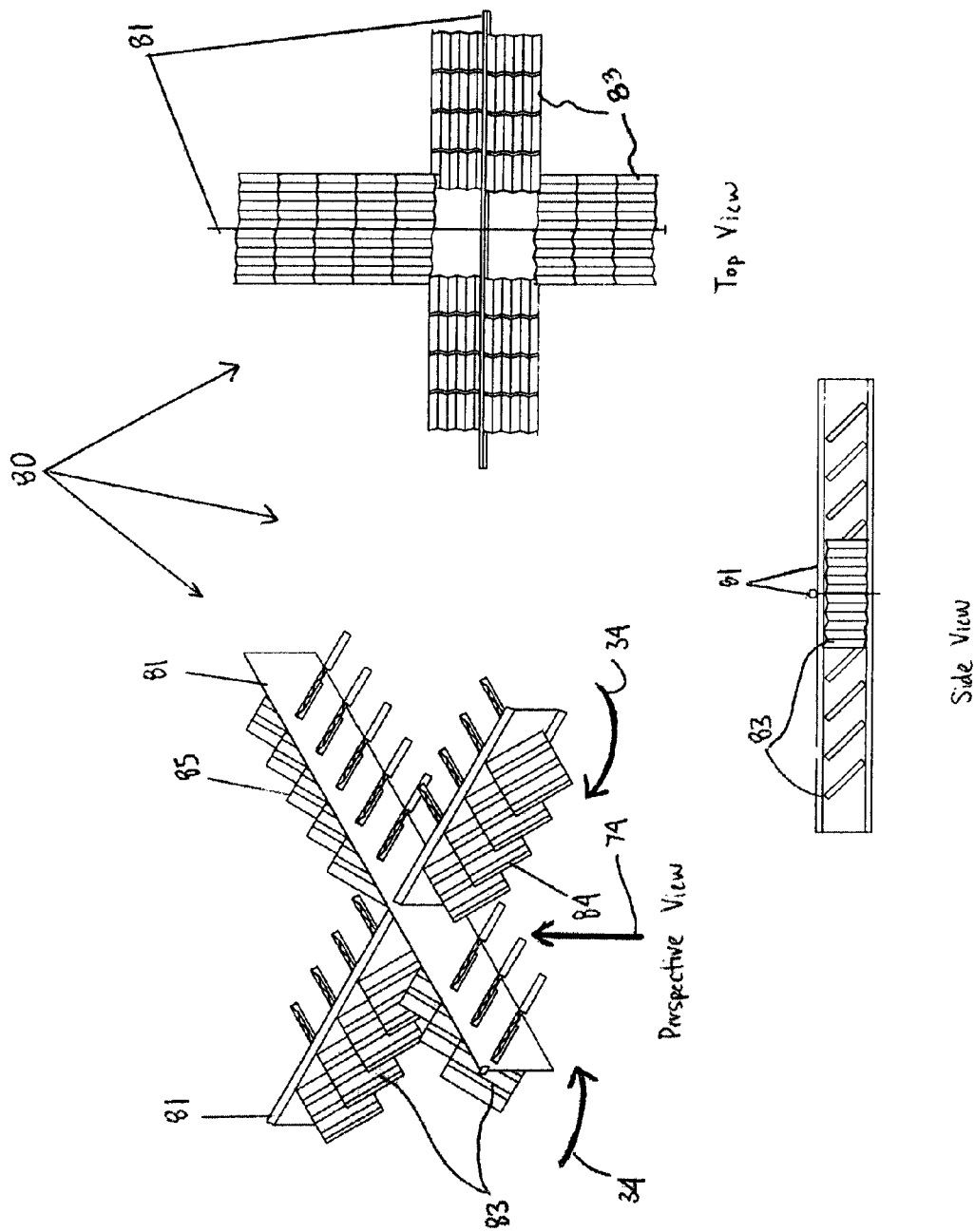
FIG. 5 shows perspective view, a top view and a side view of a mixer for dispersion and mixing.

Mixer 80, illustrated in FIG. 5, is situated above, below, or at the housing 42a level. Mixer 80 is made of a cross-shaped vertical baffles (81) with a plurality of inclined vapor directing vanes (83) located at each side of the baffle (81). Vapor directing vanes (83) which push vapor in opposite directions, one side inwards (84) towards the tower center and another side outward (85) towards the shell, can be flat or corrugated plates. Mixer 80 disperses the ascending vapor uniformly across the column cross-section and serves as a static mixing device and vortex breaker to provide mixing and dispersion of the centralized second feed 74 with first feed 34. The mixer may be used with or without a secondary vertical vapor stream 74.

Figure 6:
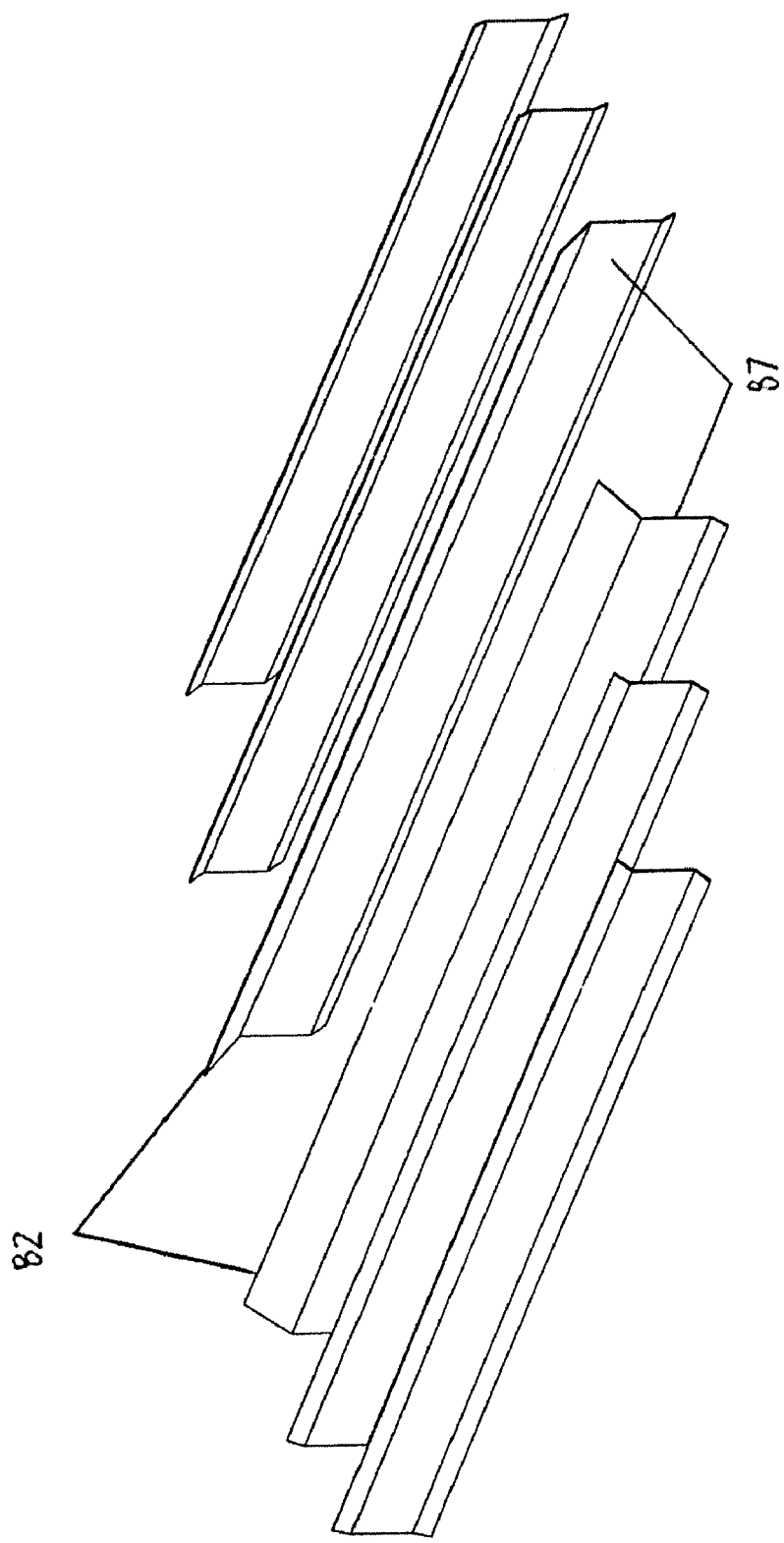
FIG. 6 shows gas directing plate details.

Referring to FIG. 6, a plurality of Z-shaped 87 vapor directing plates 82 are situated typically above the vapor distributor 22b. Plates 82 are situated symmetrically across the column 10 centerline and act as vapor "straighteners" to prevent lateral/horizontal flow and ultimately equalize the distribution of vapor to the area above the vapor inlet device 14a.

FIGS. 4a and 4b illustrate embodiment of vapor distributor 22b including a combination of new vapor inlet device 14a, mixer 80, and plates 82.

Figure 7A:
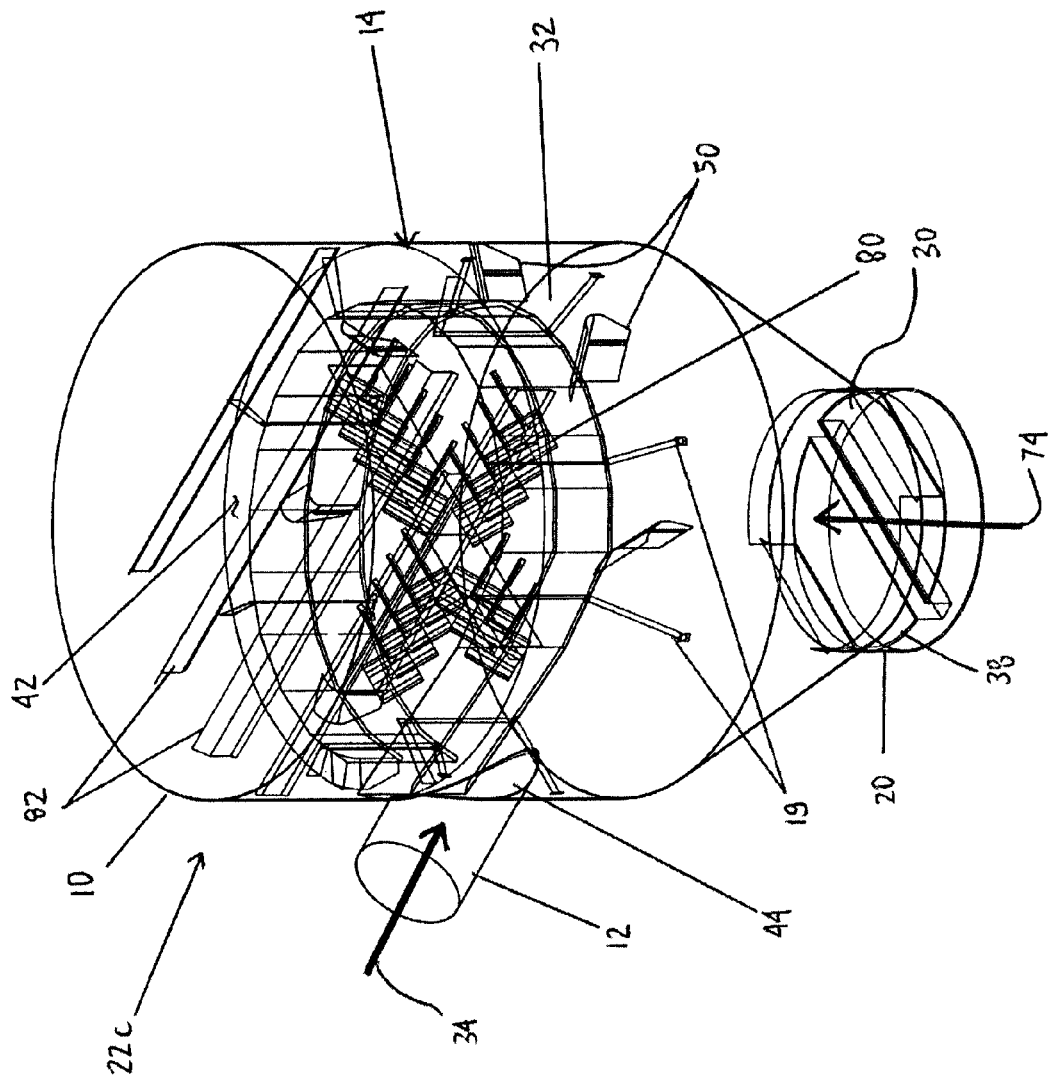
FIG. 7a is a perspective view of a column having a prior art vapor distributor, a mixer, and gas directing plates
Figure 7B:
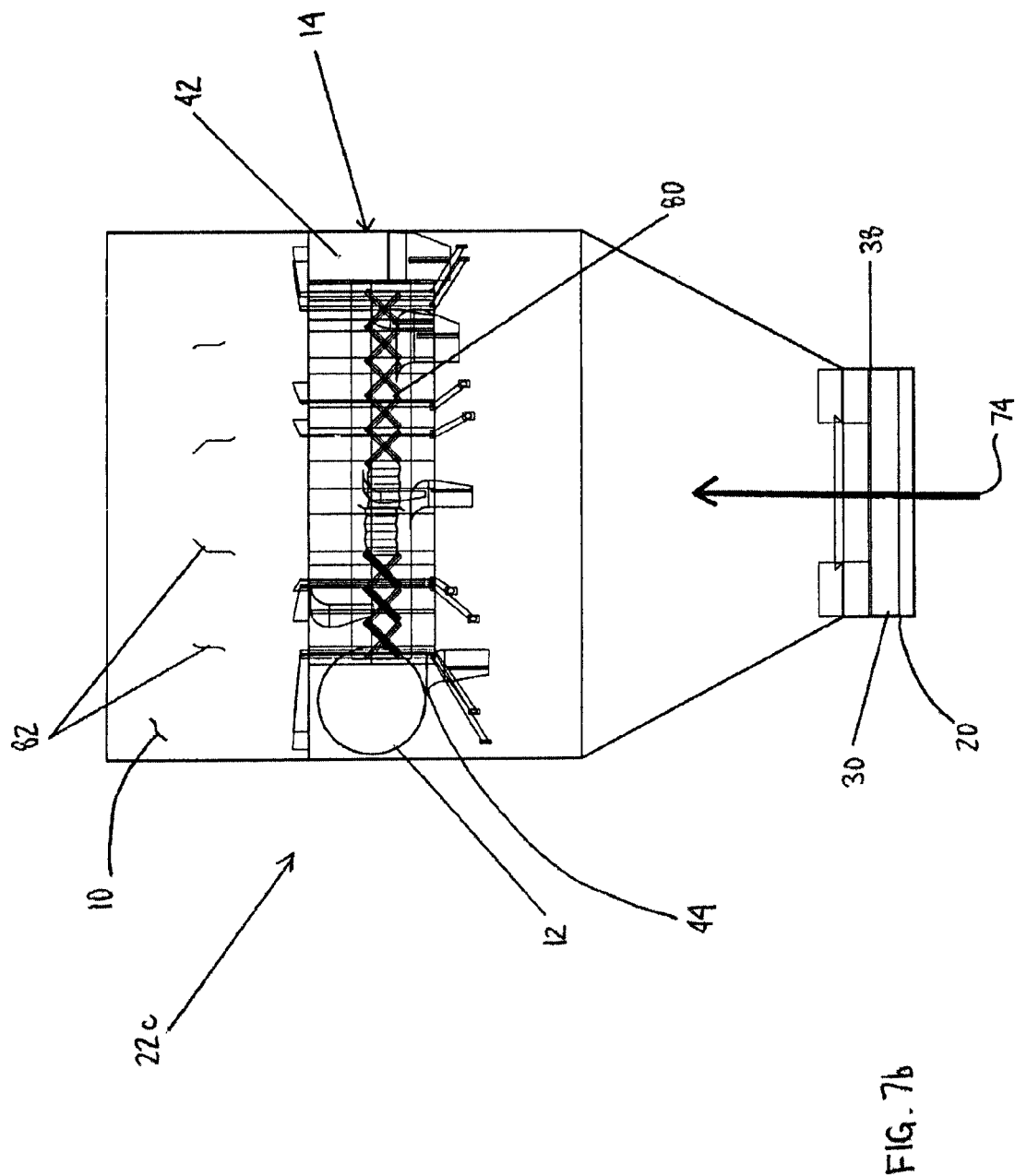

Referring to FIG. 7a and FIG. 7b, a third embodiment of vapor distributor 22c, has a combination of prior art vapor inlet device 14 with mixer 80, and plates 82. CFD simulations showed similar effectiveness of inclusion of mixer 80, and plates 82 independently of use new vapor inlet device 14a. Effectively, as with embodiment 22b of the present invention, mixer 80 provides mixing and dispersion of the ascending vapor and plates 82 acts as vapor "straighteners" to prevent lateral/horizontal flow and equalize distribution.

In summary, the new design of vapor distributor of the present invention provides several benefits in operation of a gas-liquid contacting or distillation column.

Division of the laterally fed vapor stream into two streams that flow in opposed rotational directions, and which thereby reduce each others rotational momentum when they interact, reduces the cyclonic swirling of the mixed feeds, thereby reducing the force of the vapor flow on the liquid flowing down the walls, and so prevents or reduces re-entrainment of liquid and premature flooding in the trayed section below.

The cyclonic action of the lateral feed introduced via the vapor distributor provides efficient separation of any liquid droplets entrained in either feed.

There is enhanced mixing and distribution of input vapor streams across the cross-sectional area of the column when compared with prior art vapor distributors.

REFERENCES CITED

U.S. Patent Documents

| | | | |
|---|---|---|---|
| 7,104,529 | September 2006 | Laird et al. | 261/79.2 |
| 6,948,705 | September 2005 | Lee et al. | 261/79.2 |
| 6,889,962 | May 2005 | Laird et al. | 261/79.2 |
| 6,889,961 | May 2005 | Laird et al. | 261/79.2 |
| 5,632,933 | May 1997 | Yeoman et al. | 261/109 |
| 5,605,654 | February 1997 | Hsieh et al. | 261/79.2 |
| 5,106,544 | April 1992 | Lee et al. | 261/79.2 |
| 4,770,747 | September 1988 | Muller | 202/176 |

What is claimed is:

1. A vapor distributor, for use in a gas-liquid contacting column, comprising:
   a first vapor feed that feeds laterally into the column;
   a second vapor feed that rises vertically from a portion of the column below the vapor distributor;
   a vapor inlet pipe having a nozzle that feeds the first vapor feed into a vapor inlet device comprising first and second housings and a plurality of vanes;
   the nozzle being divided into a first opening that directs a portion of the first vapor feed as a first stream traveling along the first housing and a second opening directing the remaining portion of the first vapor feed along the second housing;
   the first and second housings being situated closely adjacent the walls of the column, and progressing horizontally in opposed directions about the inside of the column so that the directions of flow of the first portion and the second portion of the first vapor feed are also opposed;
   a plurality of vapor directing vanes in each of the first and second housings that redirect flow of the first vapor feed so as to distribute the first vapor feed across the cross-sectional area of the column; and
   a vapor mixer secured within the column, and the vapor mixer serving as a static mixer, dispersion device and vortex breaker.

2. The vapor distributor according to claim 1, wherein the first housing and the second housing are proportioned to accommodate the proportions of the first stream and the second stream of the first vapor feed.

3. The vapor distributor according to claim 1 wherein the redirecting vanes have progressively different dimensions so as to enhance capability for mixing and vapor distribution at each vapor directing vane.

4. The vapor distributor according to claim 1, wherein the number of vapor directing vanes in each of the first housing and the second housing are proportioned to accommodate the different flows of the respective streams.

5. The vapor distributor of claim 1, wherein the vapor mixer comprises a plurality of gas directing vanes.

6. The vapor distributor of claim 5, wherein the gas directing vanes are secured to one of the bottom of a tray immediately above the vapor distributor or the top of the vapor.

7. A vapor distributor, for use in a gas-liquid contacting column, comprising:
- a first vapor feed that feeds laterally into the column;
- a second vapor feed that rises vertically from a portion of the column below the vapor distributor;
- a vapor inlet pipe having a nozzle that feeds the first vapor feed into a vapor inlet device comprising at least one housing and a plurality of vanes;
- the nozzle directing the first vapor feed along the at least one housing;
- the at least one housing being situated closely adjacent the walls of the column, and progressing horizontally about the inside of the column;
- a plurality of vapor directing vanes in the at least one housing that redirect flow of the first vapor feed so as to distribute the first vapor feed across the cross-sectional area of the column; and
- a vapor mixer secured within the column, the vapor mixer serving as a static mixer, dispersion device and vortex breaker.

8. The vapor distributor of claim 7, wherein the at least one housing comprises first and second housings, the first and second housings is situated closely adjacent the walls of the column, and progresses horizontally in opposed directions about the inside of the column; and the nozzle is divided into a first opening that directs a portion of the first vapor feed as a first stream traveling along the first housing and a second opening directs the remaining portion of the first vapor feed along the second housing so that the directions of flow of the first portion and the second portion of the first vapor feed are opposed.

9. The vapor distributor according to claim 8, wherein the first housing and the second housing are proportioned to accommodate the proportions of the first stream and the second stream of the first vapor feed.

10. The vapor distributor according to claim 7, wherein the redirecting vanes have progressively different dimensions so as to enhance capability for mixing and vapor distribution at each vapor directing vane.

11. The vapor distributor according to claim 7, wherein the number of vapor directing vanes in the at least one housing are proportioned to accommodate the different flows of the respective streams.

12. The vapor distributor of claim 7, wherein the vapor mixer comprises a plurality of gas directing vanes.

13. The vapor distributor of claim 12, wherein the gas directing vanes are secured to one of the bottom of a tray immediately above the vapor distributor or the top of the vapor distributor.

* * * * *